(12) United States Patent
Ishihara et al.

(10) Patent No.: US 10,661,712 B2
(45) Date of Patent: May 26, 2020

(54) BIRD'S-EYE VIEW IMAGE SYSTEM, BIRD'S-EYE VIEW IMAGE DISPLAY METHOD AND PROGRAM

(71) Applicant: TADANO LTD., Kagawa (JP)

(72) Inventors: Hiroki Ishihara, Kagawa (JP); Keiji Sato, Saitama (JP); Hideyuki Higashi, Saitama (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 16/329,420

(22) PCT Filed: Sep. 8, 2017

(86) PCT No.: PCT/JP2017/032534
§ 371 (c)(1),
(2) Date: Feb. 28, 2019

(87) PCT Pub. No.: WO2018/047954
PCT Pub. Date: Mar. 15, 2018

(65) Prior Publication Data
US 2019/0248289 A1 Aug. 15, 2019

(30) Foreign Application Priority Data
Sep. 9, 2016 (JP) .................................. 2016-176872

(51) Int. Cl.
*B60R 1/00* (2006.01)
*B60R 11/04* (2006.01)
(Continued)

(52) U.S. Cl.
CPC ............... *B60R 1/00* (2013.01); *B60R 11/02* (2013.01); *B60R 11/04* (2013.01); *B66C 13/00* (2013.01);
(Continued)

(58) Field of Classification Search
CPC ............... B60R 1/00; B60R 2300/802; B60R 2300/607; B60R 2300/105;
(Continued)

(56) References Cited

U.S. PATENT DOCUMENTS

2005/0265711 A1* 12/2005 Heibel .................... B60R 11/04
396/419
2007/0085901 A1* 4/2007 Yang ....................... H04N 7/181
348/47

FOREIGN PATENT DOCUMENTS

| JP | 2011-151742 A | 8/2011 |
| JP | 2015-139158 A | 7/2015 |
| JP | 2015-154406 A | 8/2015 |

OTHER PUBLICATIONS

Nov. 28, 2017, International Search Opinion issued for related PCT application No. PCT/JP2017/032534.
(Continued)

*Primary Examiner* — Obafemi O Sosanya
(74) *Attorney, Agent, or Firm* — Paratus Law Group, PLLC (57) ABSTRACT

The bird's-eye view image system is provided with a plurality of cameras for acquiring a surrounding image of the work vehicle, a display unit for displaying a bird's-eye view image based on the image acquired by the plurality of cameras, and a control unit for causing a bird's-eye view image to be generated and displayed by the display unit. The plurality of cameras have a first front camera provided in the traveling body for acquiring an image ahead of the travelling body, a first rear camera provided in the traveling body for acquiring an image backward of the traveling body, a right camera provided on the swivel base for acquiring an image rightward of the swivel base, and a left camera provided on the swivel base for acquiring an image leftward of the swivel base.

5 Claims, 8 Drawing Sheets

(51) Int. Cl.

| | |
|---|---|
| *E02F 9/26* | (2006.01) |
| *B66C 13/00* | (2006.01) |
| *G06T 1/00* | (2006.01) |
| *B60R 11/02* | (2006.01) |
| *H04N 7/18* | (2006.01) |
| *B66C 23/90* | (2006.01) |

(52) U.S. Cl.
CPC ................ *B66C 23/90* (2013.01); *E02F 9/26* (2013.01); *G06T 1/00* (2013.01); *H04N 7/18* (2013.01); *B60R 2300/105* (2013.01); *B60R 2300/607* (2013.01); *B60R 2300/802* (2013.01)

(58) Field of Classification Search
CPC ..... B60R 2300/303; B60R 11/04; H04N 7/18; H04N 7/184; G06T 1/0007
See application file for complete search history.

(56) References Cited

OTHER PUBLICATIONS

Nov. 28, 2017, International Search Report issued for related PCT application No. PCT/JP2017/032534.

\* cited by examiner

BIRD'S-EYE VIEW IMAGE SYSTEM, BIRD'S-EYE VIEW IMAGE DISPLAY METHOD AND PROGRAM

CROSS REFERENCE TO PRIOR APPLICATION

This application is a National Stage Patent Application of PCT International Patent Application No. PCT/JP2017/032534 (filed on Sep. 8, 2017) under 35 U.S.C. § 371, which claims priority to Japanese Patent Application No. 2016-176872 (filed on Sep. 9, 2016), which are all hereby incorporated by reference in their entirety.

TECHNICAL FIELD

The present invention relates to a bird's-eye view image system, a bird's-eye view image display method, and a program, used in a work vehicle.

BACKGROUND ART

The work vehicle has a large size and is easy to have a blind angle, and thus, the position of a rearview mirror or the like has been devised, but it is difficult to visually recognize the surroundings from a driving seat.

For this reason, in the work vehicle, it has been considered to use a bird's-eye view image system for forming a bird's-eye view image of the surroundings centered on the work vehicle, and for representing the image to an operator (for example, refer to Patent Literature 1 or the like). In such a bird's-eye view image system of the related art, a plurality of cameras for photographing the surroundings of a vehicle body are provided in the vehicle body, images photographed by each of the cameras are combined while being converted to an image viewed from an upper virtual viewpoint, and a bird's-eye view image of the surroundings of the vehicle body is formed. For this reason, in the bird's-eye view image system of the related art, it is possible to display the bird's-eye view image even in a position that is the blind angle from the driving seat in the surroundings of the vehicle body, and to increase the safeness of the work vehicle.

CITATION LIST

Patent Literature

Patent Literature 1: JP 2015-154406 A

SUMMARY OF THE INVENTION

Problems to be Solved by the Invention

However, there is a work vehicle in which a swivel base is provided to be swivelable on a traveling body, and a cabin (a driving seat) is provided on the swivel base. Even in such a work vehicle, as with the work vehicle described above, it is difficult to completely eliminate the blind angle from the cabin in the surroundings of the traveling body, and thus, it is desirable to form a bird's-eye view image of the surroundings of the traveling body by using a plurality of cameras, and to make the surroundings of the traveling body visible over the entire circumference.

An object of the present invention is to provide a bird's-eye view image system, a bird's-eye view image display method, and a program with which it is possible to make the surroundings of a traveling body provided with a swivel base having a cabin visible over the entire circumference.

Solutions to Problems

A bird's-eye view image system according to the present invention, includes:

a plurality of cameras for acquiring a surrounding image of a work vehicle provided with a swivelable swivel base on a traveling body; a display unit for displaying a bird's-eye view image based on the image acquired by the plurality of cameras; and a control unit for causing the bird's-eye view image to be generated and displayed by the display unit, in which the plurality of cameras have a first front camera provided in the traveling body for acquiring an image ahead of the traveling body, a first rear camera provided in the traveling body for acquiring an image backward of the traveling body, a right camera provided in the swivel base for acquiring an image rightward of the swivel base, and a left camera provided in the swivel base for acquiring an image leftward of the swivel base.

A bird's-eye view image system according to the present invention is a bird's-eye view image system for displaying a bird's-eye view image of surroundings of a work vehicle provided with a swivelable swivel base on a traveling body, and includes:

an image processing unit for acquiring a first image acquired by a camera provided on the right and left of the swivel base, and a second image acquired by a camera provided on the front and rear of the traveling body or the swivel base, and for generating the bird's-eye view image by synthesizing the first image and the second image, in which the camera for acquiring the second image is switched according to a state of the work vehicle.

A bird's-eye view image display method according to the present invention is a bird's-eye view image display method for displaying a bird's-eye view image of surroundings of a work vehicle provided with a swivelable swivel base on a traveling body, and includes:

a step of acquiring an image from a first front camera provided in the traveling body for acquiring an image ahead of the traveling body, a first rear camera provided in the traveling body for acquiring an image backward of the traveling body, a right camera provided in the swivel base for acquiring an image rightward of the swivel base, and a left camera provided in the swivel base for acquiring an image leftward of the swivel base; and a step of generating and displaying the bird's-eye view image, on the basis of the acquired image.

A program according to the present invention, is a program for allowing a computer of a bird's-eye view image system for displaying a bird's-eye view image of surroundings of a work vehicle provided with a swivelable swivel base on a traveling body, to realize:

processing of acquiring an image from a first front camera provided in the traveling body for acquiring an image ahead of the traveling body, a first rear camera provided in the traveling body for acquiring an image backward of the traveling body, a right camera provided in the swivel base for acquiring an image rightward of the swivel base, and a left camera provided in the swivel base for acquiring an image leftward of the swivel base; and processing of generating and displaying the bird's-eye view image, on the basis of the acquired image.

Effects of the Invention

According to the present invention, it is possible to make the surroundings of a traveling body provided with a swivel base having a cabin visible over the entire circumference.

DESCRIPTION OF EMBODIMENTS

Figure 5:
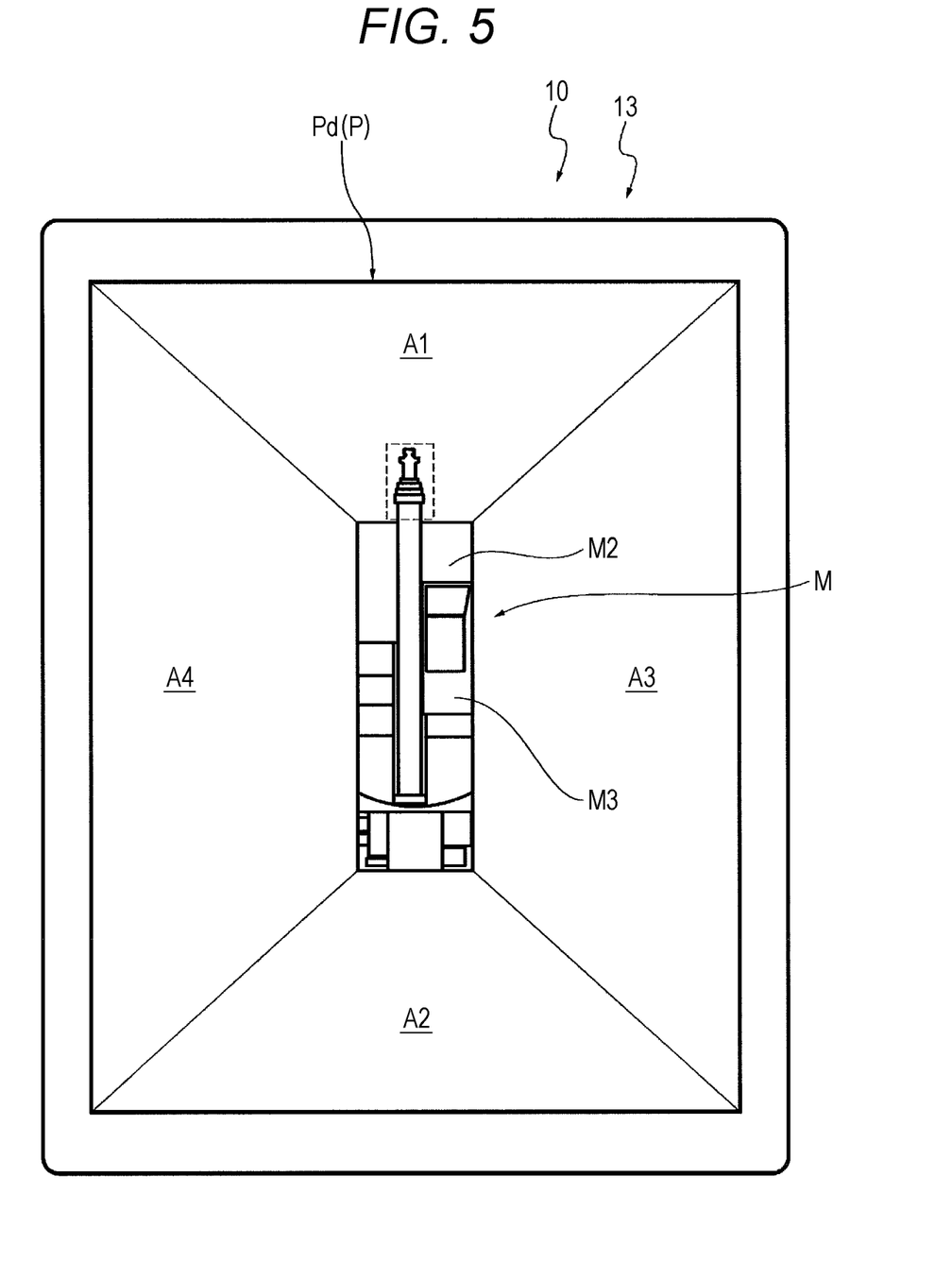
FIG. 5 is an explanatory diagram illustrating a state in which a traveling bird's-eye view image in the traveling mode is displayed on a display unit.
Figure 6:
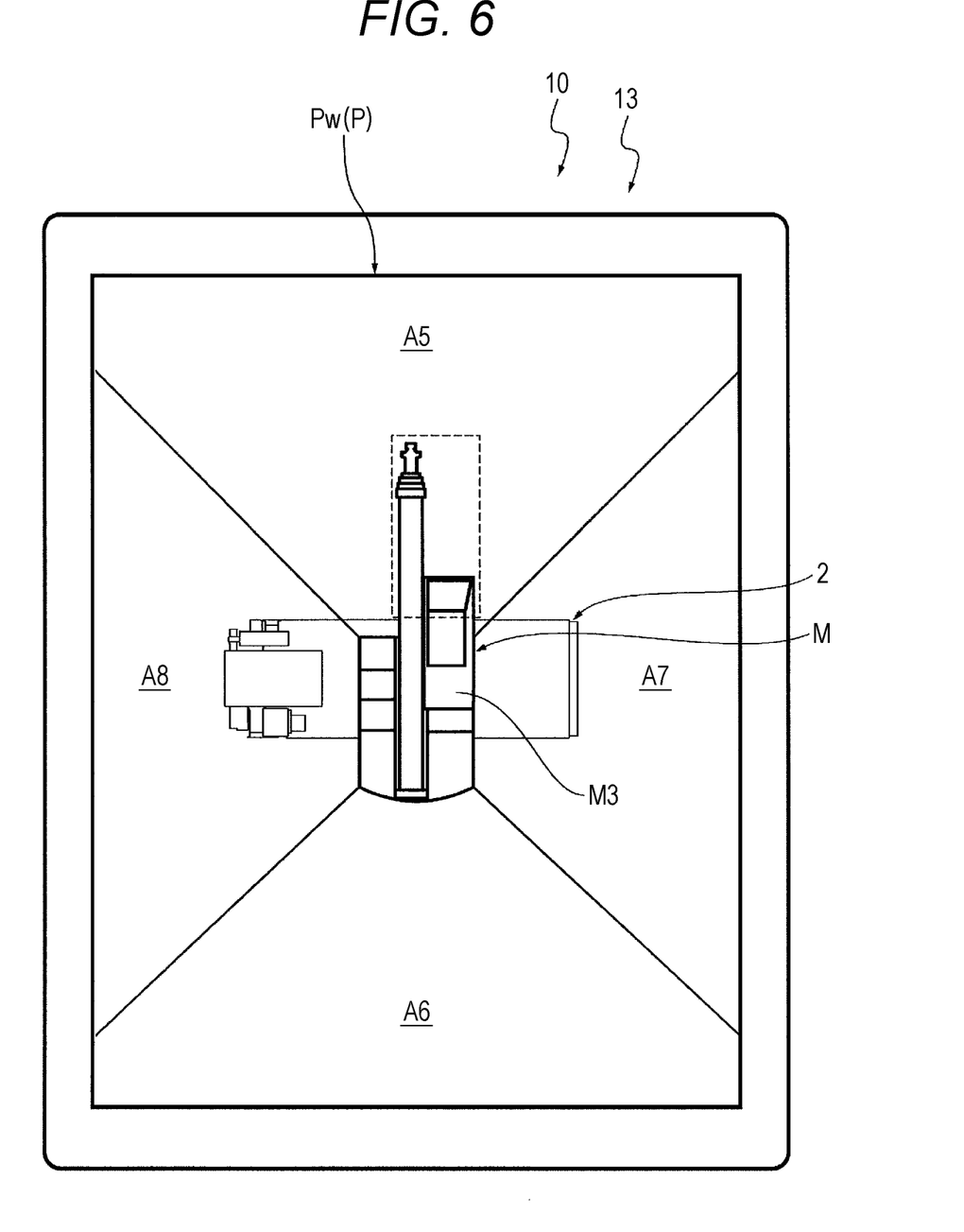
FIG. 6 is an explanatory diagram illustrating a state in which a work bird's-eye view image in the work mode is displayed on the display unit.

Hereinafter, an embodiment in which a bird's-eye view image system according to the present invention is used in a work vehicle as an example, will be described with reference to the drawings. Furthermore, FIG. 5 and FIG. 6 illustrate a state in which only a bird's-eye view image P is displayed on a display unit 13, in order to facilitate understanding of the bird's-eye view image P, but a manipulation unit 14 may be displayed on the display unit 13, and it is not necessary that the configuration is coincident with the actual configuration.

Figure 1:
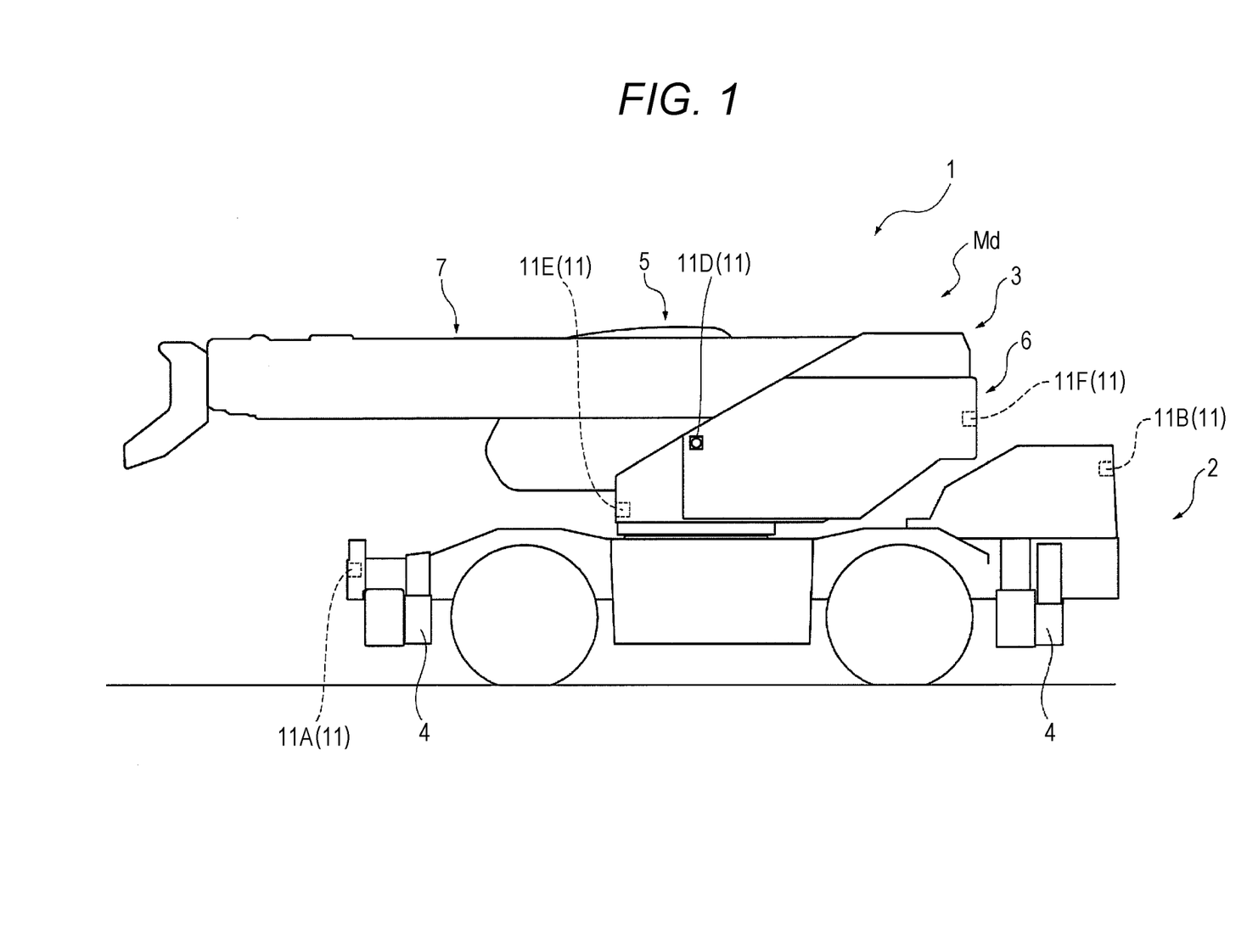
FIG. 1 is an explanatory diagram schematically illustrating a state in which a crane vehicle as an example of a work vehicle is seen from a lateral side.
Figure 2:
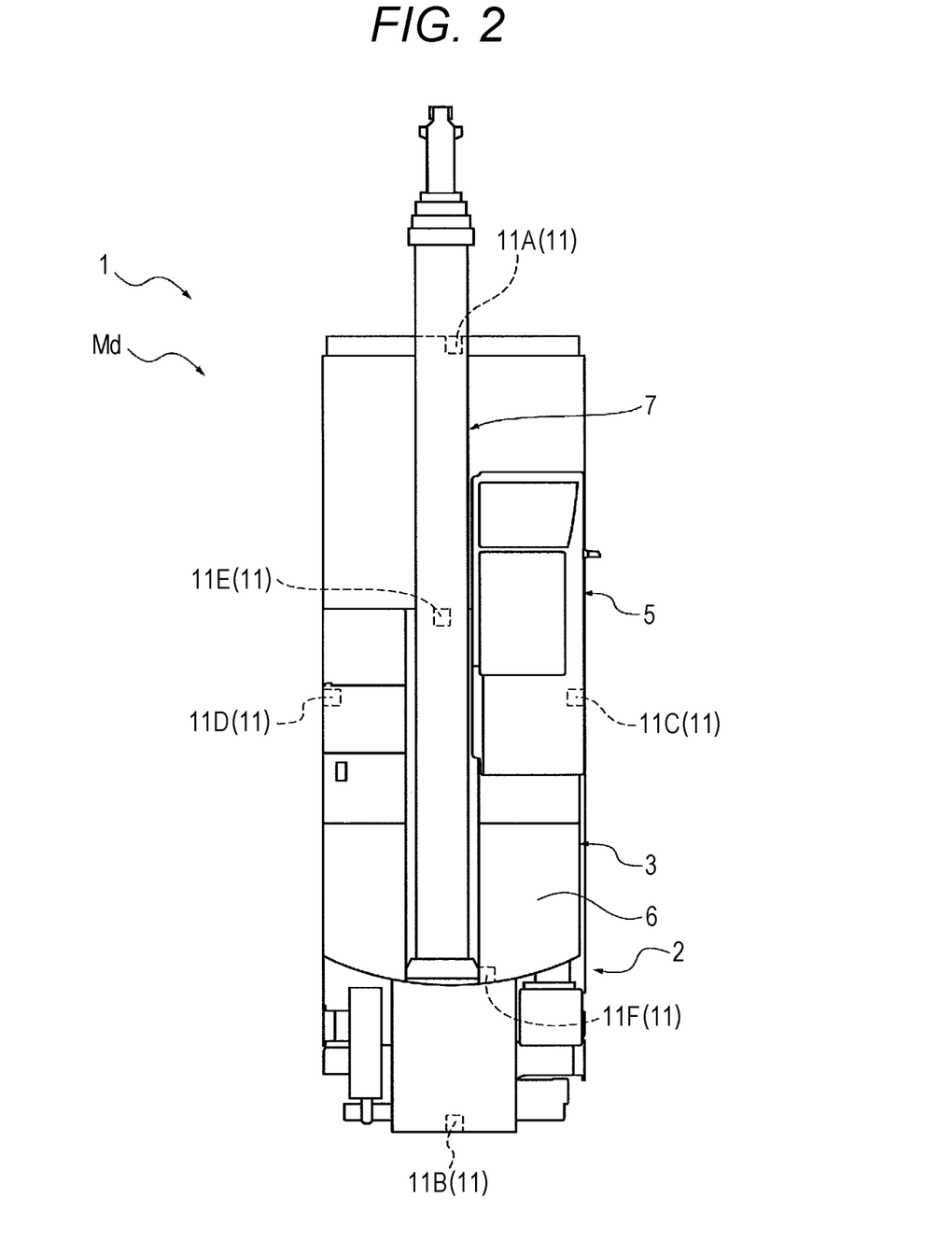
FIG. 2 is an explanatory diagram schematically illustrating a state in which the crane vehicle in a traveling mode is seen from an upper side (an upper portion) in a vertical direction (in the plan view).

A bird's-eye view image system 10 according to this embodiment will be described by using FIG. 1 to FIG. 8. As illustrated in FIG. 1 and FIG. 2, the bird's-eye view image system 10 is mounted on a crane vehicle 1 as an example of the work vehicle. The crane vehicle 1 includes a traveling body (a carrier) 2 and a swivel base 3.

The traveling body 2 is a main body portion (a vehicle body) of a vehicle having a traveling function. The traveling body 2 includes a plurality of wheels, and a driving source for driving the wheel and the swivel base 3. As illustrated in FIG. 2, the traveling body 2 has an approximately elongated rectangular shape in a front-rear direction (is an up-down direction in FIG. 2, and an upper side is the front side of the traveling body 2), in the plan view.

The traveling body 2 is configured to be capable of traveling to the front side (the upper side in FIG. 2) as a vehicle traveling direction, and to be capable of retracting to the rear side (the lower side in FIG. 2), and to be capable of being turned to the right and the left by a steering. In the traveling body 2, a pair of right and left outriggers 4 (refer to FIG. 1 (only the outrigger 4 on the left side of the traveling body 2 is illustrated in FIG. 1)) is respectively provided on the front side and the rear side. Each of the outriggers 4 is configured to be capable of being overhung and stored on the right and left, and is grounded by being suitably overhung, and thus, stably supports the traveling body 2 at the time of performing work using a boom 7 described below (in a work mode Mw described below).

As illustrated in FIG. 1 and FIG. 2, the swivel base 3 is provided in the upper portion of the traveling body 2 to be horizontally swivelable. The swivel base 3 integrally includes a swivelable cabin 5 and a boom support 6.

The cabin 5 is a boarding place of an operator, and the upper side of FIG. 2 is the front side of the cabin 5. In the cabin 5, a manipulation unit for performing various manipulations by the operator, is provided. Examples of various manipulations include the swivel of the swivel base 3, the undulation and the contraction of the boom 7 described below, the winding and the unwinding of a winch provided in the boom support 6, the overhang and the storage of the outrigger 4, the initiation and the stop of an engine, the traveling of the traveling body 2, and the like. In this embodiment, the cabin 5 is provided on the right side of the swivel base 3 with respect to the vehicle traveling direction (the forward side). The swivel base 3 has a size such that the cabin 5 and the boom support 6 fit onto the traveling body 2. In this embodiment, a width dimension of the cabin 5 (a dimension in a right-left direction of FIG. 2) is approximately identical to that of the traveling body 2, and a length dimension (a dimension in the up-down direction of FIG. 2) is smaller than that of the traveling body 2.

The boom support 6 is a spot to which the boom 7 is attached. A base end portion of the boom 7 is attached to the boom support 6 through a boom root fulcrum pin. The boom 7 is capable of undulating around the boom root fulcrum pin. In addition, a cylinder for undulation (not illustrated) is provided between the boom support 6 and the boom 7. The cylinder for undulation contracts, and thus, the boom 7 undulates.

The boom 7 is arranged on the left side of the cabin 5, in the swivel base 3, and extends in the front-rear direction. As illustrated in FIG. 1, the boom 7 is retained in a horizontal posture at the time of not being used, such as at the time of traveling. A tip end portion of the boom 7 (the upper side in FIG. 2) protrudes to the front from the traveling body 2. Furthermore, the boom 7 may be a so-called slant boom that is retained in a posture where a tip end is lowered.

The boom 7 includes a base end boom portion, an intermediate boom portion, and a tip end boom portion connected together through a contraction cylinder in the inside. The intermediate boom portion and the tip end boom portion are sequentially stored in the base end boom portion from the outside to the inside according to a nested combination, and contract according to the contraction of the contraction cylinder. A sheave is provided in the tip end boom portion, a wire is wound around the sheave, and a hook is suspended. The boom 7 is in a state where each of the boom portions is stored at the time of not being used, such as at the time of traveling (a traveling mode Md described below (refer to FIG. 2 or the like)).

Figure 3:
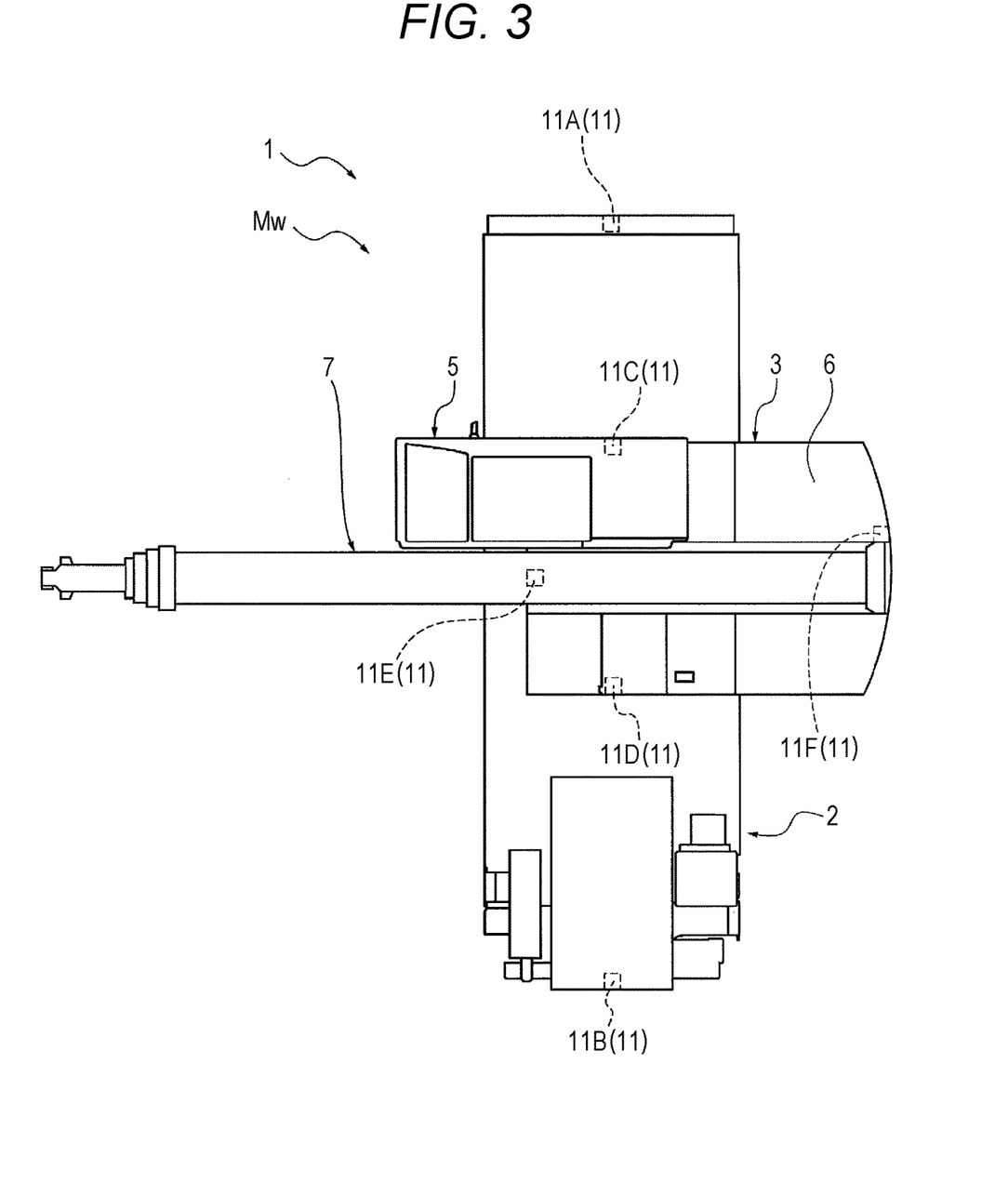
FIG. 3 is an explanatory diagram identical to FIG. 2 illustrating an example of a state of the crane vehicle in a work mode.

The crane vehicle 1 includes the traveling mode Md and the work mode Mw. As described above, the traveling mode Md is a state in which the boom 7 is stored, and the front side of the traveling body 2 (the vehicle traveling direction) is coincident with the front side of the cabin 5 in the swivel base 3 (the operator therein) (a front direction) (refer to FIG. 2), and is a mode in which a movement is performed by the traveling. In addition, the work mode Mw is a mode in which the traveling is stopped, and as illustrated in FIG. 3, the swivel base 3 can be swiveled with respect to the traveling body 2 in order to use the boom 7.

In this embodiment, in a case where a shift switch is set to forward, neutral, or backward, the crane vehicle 1 is in the traveling mode Md. On the other hand, in a case where a PTO switch for driving power take-off (PTO) that is a mechanism of taking off engine power for driving a vehicle, in order to drive a work machine, is in an ON state, the crane vehicle 1 is in the work mode Mw. In the work mode Mw, even though it is not illustrated in FIG. 3, each of the outriggers 4 is grounded by being suitably overhung on the right and left, and the traveling body 2 is stably supported, and thus, it is possible to use the boom 7 while suitably swiveling the swivel base 3. The bird's-eye view image system 10 is mounted on the crane vehicle 1.

Figure 4:
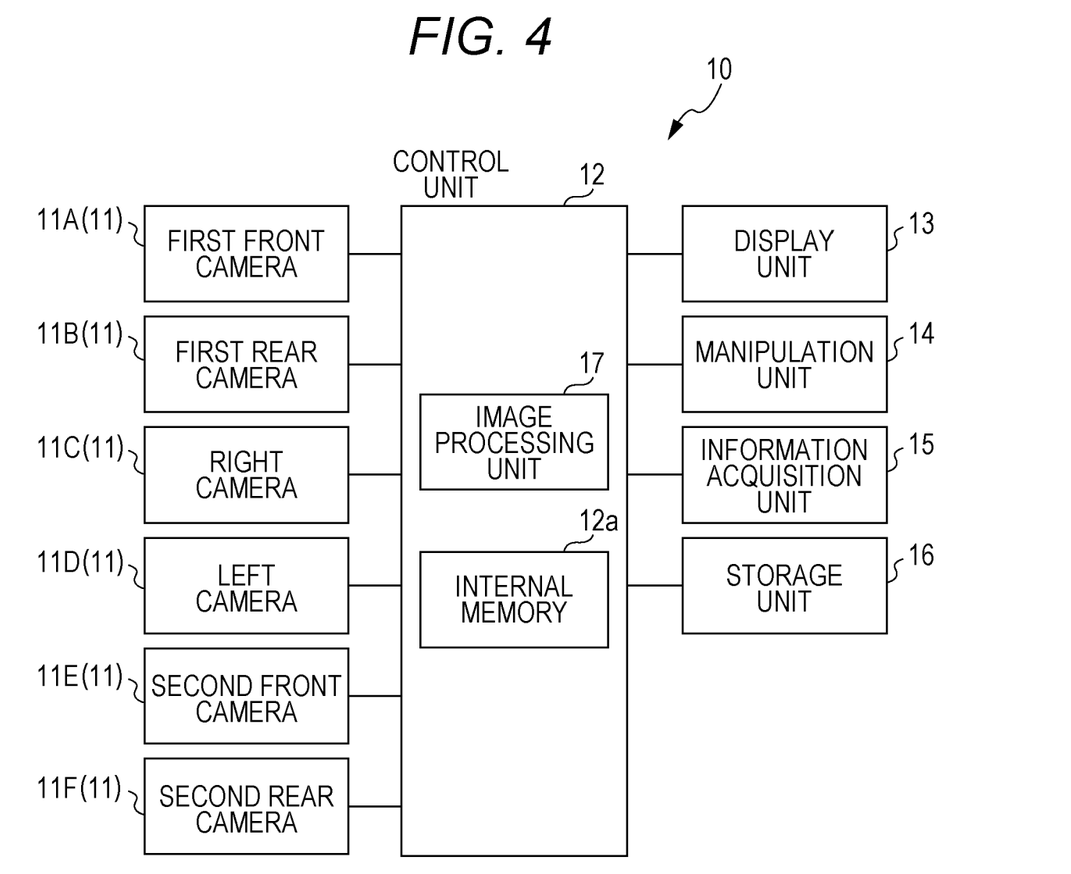
FIG. 4 is a block diagram illustrating an example of a configuration of a bird's-eye view image system used in the crane vehicle.

The bird's-eye view image system 10 represents the bird's-eye view image P (refer to FIG. 5 and FIG. 6) representing a state where the crane vehicle 1 is viewed from a virtual viewpoint of the upper side (the upper portion) in the vertical direction. As illustrated in FIG. 4, the bird's-eye view image system 10 includes six cameras 11 (11A to 11F), a control unit 12, a display unit 13, a manipulation unit 14, an information acquisition unit 15, and a storage unit 16. Each of the cameras 11 is provided in a predetermined position, in consideration of acquiring an image of the surroundings of the traveling body 2 in the crane vehicle 1, and of acquiring an image of the surroundings of the swivel base 3 in the crane vehicle 1. For example, a wide-angle camera of which a field angle is approximately 180 degrees, is used in the camera 11.

The image of the surroundings of the traveling body 2 is an image of a ground surface surrounding the traveling body 2 (a traveling surface), seen from the upper side (the upper portion) in the vertical direction, and is an image of a ground surface of a region from the circumference of the traveling body 2 to a position of a predetermined distance centered on the traveling body 2 (refer to FIG. 5). In addition, the image of the surroundings of the swivel base 3 is basically an image of a ground surface surrounding the swivel base 3 (the traveling surface), seen from the upper side (the upper portion) in the vertical direction, and is an image of a ground surface of the region from the circumference of the swivel base 3 to a position of a predetermined distance centered on the swivel base 3 (refer to FIG. 6). Here, the swivel base 3 is swivelable in the upper portion of the traveling body 2, and thus, as described below, there is a case where a part of the traveling body 2 is imaged on the image of the surroundings of the swivel base 3 (refer to FIG. 6).

As illustrated in FIG. 1 and FIG. 2, the camera 11 includes a first front camera 11A for acquiring an image ahead of the traveling body 2, a first rear camera 11B for acquiring an image backward of the traveling body 2, a right camera 11C for acquiring an image rightward of the traveling body 2, and a left camera 11D for acquiring an image leftward of the traveling body 2. The first front camera 11A is provided on the end portion (the front end) of the traveling body 2 on the forward side in the traveling body 2, and the first rear camera 11B is provided on the end portion (the rear end) of the traveling body 2 on the backward side in the traveling body 2. In addition, the right camera 11C is provided on the right end of the swivel base 3, which is the right side of the cabin 5, and the left camera 11D is provided on the left end of the swivel base 3, which is the left side of the cabin 5.

Here, the traveling body 2 has an approximately elongated rectangular shape in the front-rear direction (the vehicle traveling direction), and thus, even in a case of using the wide-angle camera, it is difficult to acquire an image of a region on both sides over the entire region, by being provided with only one wide-angle camera on the right and left of the traveling body 2. In addition, in the crane vehicle 1 on which the bird's-eye view image system 10 is mounted, the traveling body 2 and the swivel base 3 have approximately the same width dimension, and thus, in the traveling mode Md where the front side of the traveling body 2 and the front side of the swivel base 3 (the cabin 5) are coincident with each other, both lateral ends of the swivel base 3 are approximately coincident with both lateral ends of the traveling body 2.

Therefore, in this embodiment, the right camera 11C and the left camera 11D are provided on both sides of the swivel base 3, and such an installation position is higher than the first front camera 11A and the first rear camera 11B provided in the traveling body 2. Accordingly, a photographing region in the front-rear direction is widened, compared to a case where cameras having the same performance are provided on both sides of the traveling body 2, and thus, an image of a region on both sides of the swivel base 3, that is, on both sides of the traveling body 2 in the traveling mode Md (a right region A3 and a left region A4 described below (refer to FIG. 5)) can be acquired over the entire region. Therefore, in the traveling mode Md, the bird's-eye view image system 10 is capable of generating the bird's-eye view image P that makes the surroundings of the traveling body 2 visible over the entire circumference, on the basis of the images on both sides of the traveling body 2, which are acquired by the right camera 11C and the left camera 11D, and the images on the front and rear sides of the traveling body 2, which are acquired by the first front camera 11A and the first rear camera 11B (refer to FIG. 5).

In addition, the camera 11 includes a second front camera 11E for acquiring an image ahead of the swivel base 3, and a second rear camera 11F for acquiring an image backward of the swivel base 3. The second front camera 11E is provided on the front end of the swivel base 3, which is the front side of the cabin 5, and the second rear camera 11F is provided on the rear end of the swivel base 3, which is the rear surface side of the cabin 5. For this reason, the bird's-eye view image system 10 is capable of generating the bird's-eye view image P that makes the surroundings of the swivel base 3 visible over the entire circumference, on the basis of the image on both sides of the swivel base 3, which are acquired by the right camera 11C and the left camera 11D, and the images on the front and rear sides of the swivel base 3, which are acquired by the second front camera 11E and the second rear camera 11F. Furthermore, the detailed position of each of the cameras 11 may be suitably set, insofar as each of the cameras 11 acquires the image of the surroundings of the traveling body 2 or the swivel base 3 over the entire circumference without any discontinuity, and is not limited to the configuration of this embodiment (the position illustrated in FIG. 1 and FIG. 2).

As illustrated in FIG. 4, the control unit 12 is connected to the six cameras 11, the display unit 13, the manipulation unit 14, the information acquisition unit 15, and the storage unit 16. The control unit 12 is a microcomputer including a storage unit (an internal memory 12a) and an arithmetic unit. In this embodiment, the control unit 12 is provided in the cabin 5. The control unit 12 comprehensively controls the operation of the camera 11, the display unit 13, the manipulation unit 14, the information acquisition unit 15, and the storage unit 16, on the basis of a program stored in the storage unit 16 or the internal memory 12a, and suitably acquires information from the camera 11, the manipulation unit 14, and the information acquisition unit 15. The control unit 12 controls generation processing of the bird's-eye view image P (image data thereof) based on a signal from the camera 11 (image data), display processing of displaying the bird's-eye view image P on the display unit 13, determination processing of an manipulation performed by the manipulation unit 14, acquisition processing of various information items acquired by the information acquisition unit 15, and the like. In this embodiment, the control unit 12 includes an image processing unit 17 for generating the bird's-eye view image P (image data) from the image acquired by the camera 11 (the image data), on the basis of the program stored in the storage unit 16 or the internal memory 12a.

The image processing unit 17 performs each of the processings as follows, as an example, and thus, performs the generation processing of generating the bird's-eye view image P (the image data). Furthermore, the same generation processing is performed in a case of a traveling bird's-eye view image Pd (refer to FIG. 5) and in a case of a work bird's-eye view image Pw (refer to FIG. 6), described below, except that the type of camera 11 to be used (11A to 11F), a coefficient to be used, or the like is changed, and thus, the traveling bird's-eye view image Pd and the work bird's-eye view image Pw will be simply referred to as the bird's-eye view image P.

First, the image processing unit 17 performs distortion correction processing of correcting distortion due to a lens by multiplying a coordinate value of an input pixel and a lens distortion coefficient or a coefficient based on an aspect ratio or the like together, and by converting the obtained value into a coordinate value of an output pixel. In addition, the image processing unit 17 performs bird's-eye view conversion processing of forming all coordinate values of the output pixel by multiplying the coordinate value of the input pixel that is suitably selected, and various coefficients based on a camera mounting angle or the like together, and thus, of converting the coordinate values into a photographed image (an individual bird's-eye view image) viewed from a virtual viewpoint set in the upper portion of the crane vehicle 1.

Further, the image processing unit 17 performs image synthesis processing of generating the bird's-eye view image P by joining the adjacent photographed images from each of the cameras 11, in which each of the processings described above is performed without any uncomfortable feeling at a joint, by performing linear interpolation or the like with respect to the brightness of the corresponding coordinate value, as one image. Furthermore, in the generation processing executed by the image processing unit 17, the bird's-eye view image P (the image data) may be generated, the respective processings described below may be simultaneously performed, or processing of the other contents may be performed.

Here, the image processing unit 17 generates the bird's-eye view image P by switching the camera to be used, according to the mode of the crane vehicle 1 (the traveling mode Md or the work mode Mw).

Specifically, in a case where the crane vehicle 1 is in the traveling mode Md, the image processing unit 17 generates the traveling bird's-eye view image Pd (refer to FIG. 5), as the bird's-eye view image P, according to each of the processings described above, by using the image of the first front camera 11A, the image of the first rear camera 11B, the image of the right camera 11C, and the image of the left camera 11D. The first front camera 11A, the first rear camera 11B, the right camera 11C, and the left camera 11D are arranged in the position relationship described above, and thus, the traveling bird's-eye view image Pd, as illustrated in FIG. 5, is an image in which the surroundings of the traveling body 2 are consecutively projected over the entire circumference. The traveling bird's-eye view image Pd is configured of an image of a front region A1 (a front image) on the front (the forward side) of the traveling body 2, acquired by the first front camera 11A, an image of a rear region A2 (a rear image) on the rear (the backward side) of the traveling body 2, acquired by the first rear camera 11B, an image of a right region A3 (a right image) on the right (the right side) of the swivel base 3, that is, the traveling body 2, acquired by the right camera 11C, and an image of a left region A4 (a left image) on the left (the left side) of the swivel base 3, that is, the traveling body 2, acquired by the left camera 11D.

In addition, in a case where the crane vehicle 1 is in the work mode Mw, the image processing unit 17 generates the work bird's-eye view image Pw (refer to FIG. 6), as the bird's-eye view image P, according to each of the processings described above, by using the image of the second front camera 11E, the image of the second rear camera 11F, the image of the right camera 11C, and the image of the left camera 11D. The second front camera 11E, the second rear camera 11F, the right camera 11C, and the left camera 11D are arranged in the position relationship described above, and thus, the work bird's-eye view image Pw, as illustrated in FIG. 6, is an image in which the surroundings of the swivel base 3 are consecutively projected over the entire circumference. The work bird's-eye view image Pw is configured of an image of a front region A5 (a front image) on the front (the front side) of the swivel base 3, acquired by the second front camera 11E, an image of a rear region A6 (a rear image) on the rear (the rear surface side) of the swivel base 3, acquired by the second rear camera 11F, an image of a right region A7 (a right image) on the right (the right side) of the swivel base 3, acquired by the right camera 11C, and an image of a left region A8 (a left image) on the left (the left side) of the swivel base 3, acquired by the left camera 11D.

For this reason, the traveling body 2 is partially reflected on the work bird's-eye view image Pw. For example, as illustrated in FIG. 3, in a case where the swivel base 3 is swiveled with respect to the traveling body 2 by approximately 90 degrees, as illustrated in FIG. 6, the traveling body 2 is partially photographed in the front region A5 acquired by the second front camera 11E, the right region A7 acquired by the right camera 11C, and the left region A8 acquired by the left camera 11D. In addition, in the work bird's-eye view image Pw, the traveling body 2 is partially photographed even in the rear region A6 acquired by the second rear camera 11F, according to the degree of swiveling of the swivel base 3. Thus, the work bird's-eye view image Pw is obtained by photographing the traveling body 2 in a position according to the degree of swiveling of the swivel base 3. That is, in the work bird's-eye view image Pw, the traveling body 2 is displayed as a part of a surrounding image to be rotated in a direction opposite to a swivel direction of the swivel base 3.

The camera 11 is provided as described above, and thus, each of the bird's-eye view images Pd and Pw subjected to image synthesis as described is an image on the outside of the installation position of the camera 11 in the crane vehicle 1, and image information of a region on the inside of the installation position is absent. That is, the traveling bird's-eye view image Pd is an image on the outside of the traveling body 2, and thus, image information of a region in which the traveling body 2 exists, is absent. The work bird's-eye view image Pw is an image on the outside of the swivel base 3, and thus, image information of a region in which the swivel base 3 exists, is absent. For this reason, the image processing unit 17 sets an absent spot in each of the bird's-eye view images Pd and Pw, for example, to a pixel value of zero (black display).

Then, the image processing unit 17 performs superimposition processing of superimposing a work vehicle marker M (refer to FIG. 5 and FIG. 6) represented by simulatively visualizing the crane vehicle 1, on the absent spot of each of the bird's-eye view images Pd and Pw subjected to the image synthesis. As illustrated in FIG. 5 and FIG. 6, the work vehicle marker M visually represents the position and the size of the crane vehicle 1 in each of the bird's-eye view images Pd and Pw, and basically includes a traveling body marker portion M2 representing the traveling body 2, and a swivel base marker portion M3 representing the swivel base 3 including the boom 7 thereon, or the like. A bird's-eye view photograph of the actual crane vehicle 1 may be used, or a pattern representing the crane vehicle 1 in a bird's-eye view may be used, in the work vehicle marker M.

Here, the image processing unit 17 switches the work vehicle marker M to be superimposed, according to the mode in the crane vehicle 1 (the traveling mode Md or the work mode Mw), that is, the generated bird's-eye view image P. Specifically, in a case where the traveling bird's-eye view image Pd is generated in the traveling mode Md, the image processing unit 17, as illustrated in FIG. 5, superimposes the work vehicle marker M in which the swivel base marker portion M3 is superposed on the traveling body marker portion M2, on the absent region where the traveling body 2 exists. At this time, in the work vehicle marker M, as with the crane vehicle 1 that is in the traveling mode Md (refer to FIG. 2), the front side of the traveling body marker portion M2 (a spot corresponding to the forward side of the traveling body 2) and the front side of the swivel base marker portion M3 (a spot corresponding to the front side of the cabin 5 in the swivel base 3) are coincident with each other.

In addition, in a case where the work bird's-eye view image Pw is generated in the work mode Mw, the image processing unit 17, as illustrated in FIG. 6, superimposes the work vehicle marker M formed only of the swivel base marker portion M3, on the absent region where the swivel base 3 exists. This is because the work bird's-eye view image Pw is the image of the surroundings of the swivel base 3 over the entire circumference, and as described above, the traveling body 2 is imaged on the work bird's-eye view image Pw, and thus, in a case where only the swivel base marker portion M3 is represented, a state in which the swivel base marker portion M3 exists on the traveling body 2, as with the actual crane vehicle 1, is obtained.

The control unit 12 outputs each of the bird's-eye view images Pd and Pw (the image data items) generated by the image processing unit 17, to the display unit 13 to be displayed on the display unit 13 (refer to FIG. 5 and FIG. 6), and suitably stores each of the bird's-eye view images Pd and Pw in the storage unit 16. At this time, the control unit 12 positions the front side of the traveling body marker portion M2 and the front side of the swivel base marker portion M3, and front regions A1 and A5 in each of the bird's-eye view images Pd and Pw, on the upper side where the display unit 13 is seen from the front side, and displays each of the bird's-eye view images Pd and Pw on the display unit 13. For this reason, the front regions A1 and A5 and the front side of the swivel base marker portion M3, which are a front surface seen from the cabin 5, are positioned and displayed on the upper side of the display unit 13, and thus, the display of each of the bird's-eye view images Pd and Pw is coincident with the feeling of the operator in the cabin 5. In addition, the control unit 12 performs predetermined processing, on the basis of manipulation information (data) from the manipulation unit 14 or various information items (data items) from the information acquisition unit 15.

The display unit 13 is capable of displaying the bird's-eye view image P or various information items of the crane vehicle 1, and in this embodiment, the display unit 13 is provided in the cabin 5 of the swivel base 3. The display unit 13 is capable of displaying the bird's-eye view image P generated on the basis of the image acquired by the camera 11 (refer to FIG. 5 and FIG. 6) instantly and consecutively (in real time), under the control of the control unit 12. In this embodiment, the display unit 13 is provided with a function of a touch panel.

The manipulation unit 14 is a manipulation unit for using various functions of the bird's-eye view image system 10, and outputs information subjected to an input manipulation, to the control unit 12. In this embodiment, the manipulation unit 14 is configured as a screen (various icons or the like on the screen) to be displayed on the display unit 13 having the function of the touch panel. The manipulation unit 14 is capable of performing a switching manipulation of the image to be displayed on the display unit 13, various setting manipulations of the bird's-eye view image system 10 or the crane vehicle 1, and the like. Furthermore, the manipulation unit 14 may be provided in the cabin 5 independently from the display unit 13, or may be provided as a switch around the screen of the display unit 13.

The information acquisition unit 15 acquires various operation information items relevant to the crane vehicle 1, and outputs each of the operation information items (the data items) to the control unit 12. The operation information, for example, includes mode information indicating whether the crane vehicle 1 is in the traveling mode Md or in the work mode Mw, and posture information indicating a swivel angle of the swivel base 3 (the boom 7) and an undulation angle and the length of the boom 7. In this embodiment, the information acquisition unit 15 acquires (detects) whether or not the shift switch of the crane vehicle 1 is set to forward, neutral, or backward, as the mode information indicating that the crane vehicle 1 is in the traveling mode Md, and acquires (detects) whether or not the PTO switch of the crane vehicle 1 is in the ON state, as the mode information indicating that the crane vehicle 1 is in the work mode Mw.

Thus, in the bird's-eye view image system 10, in a case where the crane vehicle 1 is in the traveling mode Md, the images of the surroundings of the traveling body 2 are acquired separately on the front and rear, and on the right and left, by using the first front camera 11A and the first rear camera 11B provided in the traveling body 2, and the right camera 11C and the left camera 11D provided in the swivel base 3, and are output to the control unit 12 (the image processing unit 17). The image processing unit 17, as described above, performs each processing with respect to the image (the image data) acquired by the camera 11, generates the traveling bird's-eye view image Pd (the bird's-eye view image P), and superimposes the work vehicle marker M in which the swivel base marker portion M3 is superposed on the traveling body marker portion M2, on the traveling bird's-eye view image Pd. The traveling bird's-eye view image Pd on which the work vehicle marker M is superimposed, is displayed on the display unit 13, under the control of the control unit 12 (refer to FIG. 5). Accordingly, in the traveling mode Md of the crane vehicle 1, the operator is capable of easily visually recognizing the surroundings of the traveling body 2.

In addition, in the bird's-eye view image system 10, in a case where the crane vehicle 1 is in the work mode Mw, the images of the surroundings of the swivel base 3 are acquired separately on the front and rear, and on the right and left, by using the second front camera 11E, the second rear camera 11F, the right camera 11C, and the left camera 11D, provided in the swivel base 3, and are output to the control unit 12 (the image processing unit 17). The image processing unit 17, as described above, performs each processing with respect to the image (the image data) acquired by the camera 11, generates the work bird's-eye view image Pw (the bird's-eye view image P), and superimposes the work vehicle marker M formed only of the swivel base marker portion M3, on the work bird's-eye view image Pw. The work bird's-eye view image Pw on which the work vehicle marker M is superimposed, is displayed on the display unit 13, under the control of the control unit 12 (refer to FIG. 6). Accordingly, in the work mode Mw of the crane vehicle 1, the operator is capable of easily visually recognizing the surroundings of the swivel base 3.

Thus, the bird's-eye view image system 10 uses the right camera 11C and the left camera 11D provided in the swivel base 3, in common, regardless of the mode of the crane vehicle 1, and separately uses the first front camera 11A and the first rear camera 11B, provided in the traveling body 2, and the second front camera 11E and the second rear camera 11F, provided in the swivel base 3, according to the mode of the crane vehicle 1. That is, the bird's-eye view image system 10 includes the image processing unit 17 that acquires a first image acquired by the right camera 11C and the left camera 11D, provided on the right and left of the swivel base 3, and acquires a second image acquired by the first front camera 11A and the first rear camera 11B, provided on the front and rear of the traveling body 2, or the second front camera 11E and the second rear camera 11F, provided on the front and rear of the swivel base 3, and generates the bird's-eye view image by synthesizing the first image and the second image, and switches the camera for acquiring the second image, according to the state of the crane vehicle 1 (the work vehicle). Accordingly, it is possible to represent the bird's-eye view image P (the traveling bird's-eye view image Pd and the work bird's-eye view image Pw) adapted to the mode.

Figure 7:
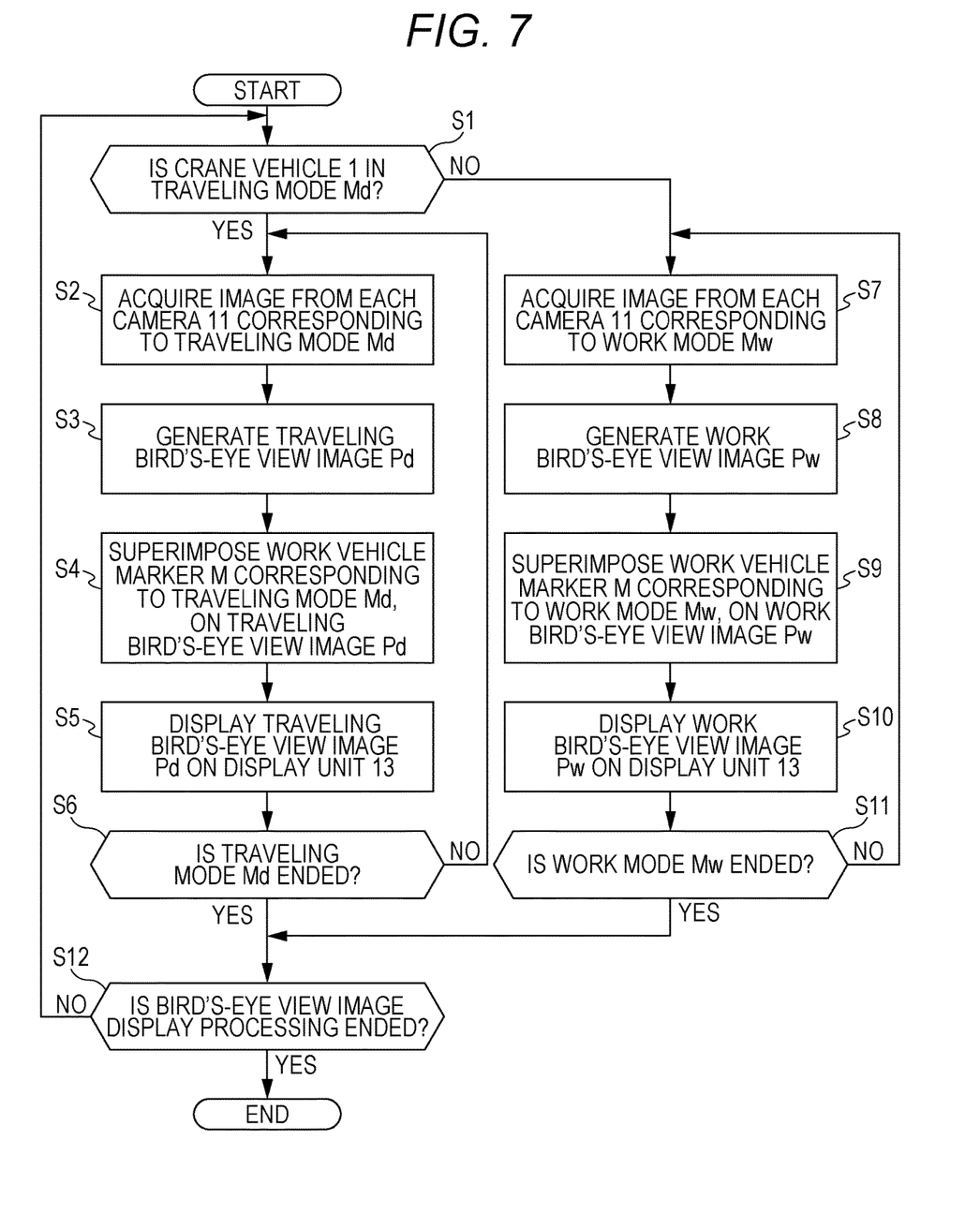
FIG. 7 is a flowchart illustrating an example of bird's-eye view image display processing executed by a control unit.

Next, in the bird's-eye view image system 10, bird's-eye view image display processing of generating the bird's-eye view image P to be displayed on the display unit 13, under the control of the control unit 12, will be described by using FIG. 7. FIG. 7 is a flowchart illustrating the bird's-eye view image display processing (a bird's-eye view image display method) executed by the control unit 12. The bird's-eye view image display processing is executed by the control unit 12, on the basis of the program stored in the internal memory 12a or the storage unit 16 of the control unit 12.

Hereinafter, each step of the flowchart of FIG. 7 will be described. The bird's-eye view image system 10 executes the bird's-eye view image display processing, and thus, the flowchart of FIG. 7 is started. The bird's-eye view image system 10 may be constantly in a state of executing the bird's-eye view image display processing, or may be capable of switching the presence or absence of the execution by the manipulation of the manipulation unit 14. Furthermore, in this example, only two modes of the traveling mode Md and the work mode Mw are set in the crane vehicle 1.

In step S1, the control unit 12 determines whether or not the crane vehicle 1 is in the traveling mode Md, and in a case of YES, the process proceeds to step S2, and in a case of NO, the process proceeds to step S7. In step S1, the control unit 12 acquires the mode information through the information acquisition unit 15, and determines whether the crane vehicle 1 is in the traveling mode Md or in the work mode Mw, on the basis of the acquired mode information. For example, in a case where the shift switch of the crane vehicle 1 is set to forward, neutral, or backward, the control unit 12 determines that the crane vehicle 1 is in the traveling mode Md, and in a case where the PTO switch of the crane vehicle 1 is in the ON state, the control unit 12 determines that the crane vehicle 1 is in the work mode Mw.

In step S2, the control unit 12 acquires the image (the image data) from the camera 11 corresponding to the traveling mode Md, and the process proceeds to step S3. In step S2, the control unit 12 acquires each of the images (the image data items) from the camera 11 corresponding to the traveling mode Md, that is, the first front camera 11A, the first rear camera 11B, the right camera 11C, and the left camera 11D.

In step S3, the control unit 12 generates the traveling bird's-eye view image Pd (the image data), and the process proceeds to step S4 (the processing as the image processing unit 17). In step S3, the traveling bird's-eye view image Pd (the image data) in which the surroundings of the traveling body 2 are represented, and the image information of the region where the traveling body 2 exists, is absent, is generated as the bird's-eye view image P.

In step S4, the control unit 12 superimposes the work vehicle marker M corresponding to the traveling mode Md, on the traveling bird's-eye view image Pd, and the process proceeds to step S5 (the processing as the image processing unit 17). In step S4, an image in which the work vehicle marker M corresponding to the traveling mode Md, that is, the work vehicle marker M in which the swivel base marker portion M3 is superposed on the traveling body marker portion M2, is superimposed on the traveling bird's-eye view image Pd, is generated.

In step S5, the control unit 12 displays the image in which the work vehicle marker M corresponding to the traveling mode Md, is superimposed on the traveling bird's-eye view image Pd, on the display unit 13 (refer to FIG. 5), and the process proceeds to step S6.

In step S6, the control unit 12 determines whether or not the traveling mode Md is ended, and in a case of YES, the process proceeds to step S12, and in a case of NO, the process returns to step S2. In step S6, the control unit 12 acquires the mode information through the information acquisition unit 15, and determines whether or not the crane vehicle 1 ends the traveling mode Md, on the basis of the acquired mode information. For example, in a case where the shift switch of the crane vehicle 1 is transitioned to other states from the forward, neutral, and backward, the control unit 12 determines that the crane vehicle 1 ends the traveling mode Md.

In step S7, the control unit 12 acquires the image (the image data) from the camera 11 corresponding to the work mode Mw, and the process proceeds to step S8. In step S7, it is not the traveling mode Md, that is, it is the work mode Mw, and thus, the control unit 12 acquires each of the images (the image data items) from the camera 11 corresponding to the work mode Mw, that is, the second front camera 11E, the second rear camera 11F, the right camera 11C, and the left camera 11D.

In step S8, the control unit 12 generates the work bird's-eye view image Pw (the image data), and the process proceeds to step S9 (the processing as the image processing unit 17). In step S8, the work bird's-eye view image Pw (the image data) in which the surroundings of the swivel base 3 are represented, and the image information of the region where the swivel base 3 exists, is absent, is generated as the bird's-eye view image P.

In step S9, the control unit 12 superimposes the work vehicle marker M corresponding to the work mode Mw, on the work bird's-eye view image Pw, and the process proceeds to step S10 (the processing as the image processing unit 17). In step S9, the work vehicle marker M corresponding to the work mode Mw, that is, the image in which the work vehicle marker M formed only of the swivel base marker portion M3, is superimposed on the work bird's-eye view image Pw, is generated.

In step S10, the control unit 12 displays the image in which the work vehicle marker M corresponding to the work mode Mw, is superimposed on the work bird's-eye view image Pw, on the display unit 13 (refer to FIG. 6), and the process proceeds to step S11.

In step S11, the control unit 12 displays the work bird's-eye view image Pw on the display unit 13 in step S10, and then, determines whether or not the work mode Mw is ended, and in a case of YES, the process proceeds to step S12, and in a case of NO, the process returns to step S7. In step S11, the control unit 12 acquires the mode information through the information acquisition unit 15, and determines whether or not the crane vehicle 1 ends the work mode Mw, on the basis of the acquired mode information. For example, in a case where the PTO switch of the crane vehicle 1 is transitioned to an OFF state from the ON state, the control unit 12 determines that the work mode Mw is ended.

In step S12, the control unit 12 determines whether or not the bird's-eye view image display processing is ended, and in a case of YES, the bird's-eye view image display processing is ended, and in a case of NO, the process returns to step S1. In step S12, it is a scene where the continued mode (the traveling mode Md and the work mode Mw) is ended, and thus, the control unit 12 determines whether or not the control unit 12 ends the bird's-eye view image display processing, that is, whether or not the display of the bird's-eye view image P on the display unit 13 is stopped. Such determination, for example, may be performed on the basis of the manipulation of the manipulation unit 14, or may be performed on the basis of the fact that a power source of the bird's-eye view image system 10 is turned off or an engine of the crane vehicle 1 is stopped. Furthermore, the determination of whether or not the bird's-eye view image display processing is ended, is performed while the traveling mode Md is continued (steps S2 to S6), or while the work mode Mw is continued (steps S7 to S11), and thus, the display of the bird's-eye view image P can be stopped regardless of the mode of the crane vehicle 1.

Next, the operation of the bird's-eye view image system 10 according to this embodiment, will be described. In a case where the crane vehicle 1 is in the traveling mode Md when the bird's-eye view image system 10 is in a state where the bird's-eye view image display processing is executed, in the flowchart of FIG. 7, the process proceeds to steps S1→S2→S3, and thus, the control unit 12 (the image processing unit 17) generates the traveling bird's-eye view image Pd of the surroundings of the traveling body 2. Then, in the flowchart of FIG. 7, the process proceeds to step S4, and thus, the work vehicle marker M in which the swivel base marker portion M3 is superposed on the traveling body marker portion M2, is superimposed on the traveling bird's-eye view image Pd, and the process proceeds to step S5, and thus, the image in which the work vehicle marker M is superimposed on the traveling bird's-eye view image Pd, is displayed on the display unit 13 (refer to FIG. 5). Such processings are continued until the traveling mode Md of the crane vehicle 1 is ended, in step S6 in the flowchart of FIG. 7.

In addition, in a case where the crane vehicle 1 is in the work mode Mw when the bird's-eye view image system 10 is in a state where the bird's-eye view image display processing is executed, in the flowchart of FIG. 7, the process proceeds to step S1→S7→S8, and thus, the control unit 12 (the image processing unit 17) generates the work bird's-eye view image Pw of the surroundings of the swivel base 3. Then, in the flowchart of FIG. 7, the process proceeds to step S9, and thus, the work vehicle marker M formed only of the swivel base marker portion M3 is superimposed on the work bird's-eye view image Pw, and the process proceeds to step S10, and thus, the image in which the work vehicle marker M is superimposed on the work bird's-eye view image Pw, is displayed on the display unit 13 (refer to FIG. 6). Such processings are continued until the work mode Mw of the crane vehicle 1 is ended, in step S11 in the flowchart of FIG. 7.

Then, in the bird's-eye view image system 10, the processings described above are continued until it is determined that the bird's-eye view image display processing is ended, in step S12 in the flowchart of FIG. 7. Accordingly, the bird's-eye view image system 10 represents the bird's-eye view image P of the surroundings according to the mode of the crane vehicle 1, to the operator, in real time, through the display unit 13. In addition, the bird's-eye view image system 10 changes the state of the work vehicle marker M to be the superimposed on the bird's-eye view image P, according to the mode of the crane vehicle 1, and thus, represents the bird's-eye view image P to the operator, in a state close to a state where the actual crane vehicle 1 is in a bird's-eye view.

According to the configuration described above, the bird's-eye view image system 10 according to the embodiment to which the present invention is applied, is capable of obtaining each of the following function effects.

In the traveling mode Md, the bird's-eye view image system 10 generates the traveling bird's-eye view image Pd (the bird's-eye view image P) that is the image of the surroundings of the traveling body 2, by using the images respectively acquired by the first front camera 11A and the first rear camera 11B, provided in the traveling body 2, and the right camera 11C and the left camera 11D, provided in the swivel base 3. That is, the bird's-eye view image system 10 includes the plurality of cameras 11 for acquiring the surrounding image of the crane vehicle 1 (the work vehicle) provided with the swivelable swivel base 3 on the traveling body 2, the display unit 13 for displaying the bird's-eye view image P based on the image acquired by the plurality of cameras 11, and the control unit 12 for generating the bird's-eye view image P to be displayed on the display unit 13, and the plurality of cameras 11 include the first front camera 11A provided in the traveling body 2 for acquiring the image ahead of the traveling body 2, the first rear camera 11B provided in the traveling body 2 for acquiring the image backward of the traveling body 2, the right camera 11C provided in the swivel base 3 for acquiring the image rightward of the swivel base 3, and the left camera 11D provided in the swivel base 3 for acquiring the image leftward of the swivel base 3. For this reason, the bird's-eye view image system. 10 is capable of setting the installation position of the right camera 11C and the left camera 11D to be higher than the first front camera 11A and the first rear camera 11B, and is capable of acquiring each of the images of the regions on both sides of the traveling body 2, by one camera, regardless of the fact that the traveling body 2 is elongated on the front and rear (in the vehicle traveling direction). Accordingly, the bird's-eye view image system 10 is capable of suitably generating the traveling bird's-eye view image Pd that is the image of the surroundings of the traveling body 2 elongated on the front and rear (in the vehicle traveling direction), over the entire circumference, by using the images from the four cameras 11 (the first front camera 11A, the first rear camera 11B, the right camera 11C, and the left camera 11D), and is capable of representing the image to the operator.

In addition, in the work mode Mw, the bird's-eye view image system 10 generates the work bird's-eye view image Pw (the bird's-eye view image P) that is the image of the surroundings of the swivel base 3, by using the images respectively acquired by the second front camera 11E, the second rear camera 11F, the right camera 11C, and the left camera 11D, provided in the swivel base 3. For this reason, the bird's-eye view image system 10 is capable of constantly acquiring the images of the regions on the front side, the rear surface side, and both sides, based on the swivel base 3, according to the same combination, regardless of a swivel posture of the swivel base 3 with respect to the traveling body 2. Accordingly, the bird's-eye view image system 10 uses the images from the four cameras 11 (the second front camera 11E, the second rear camera 11F, the right camera 11C, and the left camera 11D), and thus, is capable of suitably generating the work bird's-eye view image Pw that is the image of the surroundings of the swivel base 3 swiveled with respect to the traveling body 2, over the entire circumference, and is capable of representing the image to the operator.

Further, the bird's-eye view image system 10 uses the right camera 11C and the left camera 11D provided in the swivel base 3, in common, regardless of the mode of the crane vehicle 1, and separately uses the first front camera 11A and the first rear camera 11B, provided in the traveling body 2, and the second front camera 11E and the second rear camera 11F, provided in the swivel base 3, according to the mode of the crane vehicle 1. That is, in the bird's-eye view image system 10, the plurality of cameras 11 include the second front camera 11E provided in the swivel base 3 for acquiring the image ahead of the swivel base 3, and the second rear camera 11F provided in the swivel base 3 for acquiring the image backward of the swivel base 3, and in the traveling mode Md, the control unit 12 generates the traveling bird's-eye view image Pd (the bird's-eye view image) on the basis of the image of the first front camera 11A, the image of the first rear camera 11B, the image of the right camera 11C, and the image of the left camera 11D, and in the work mode Mw, the control unit 12 generates work bird's-eye view image Pw (the bird's-eye view image) on the basis of the image of the second front camera 11E, the image of the second rear camera 11F, the image of the right camera 11C, and the image of the left camera 11D. For this reason, the bird's-eye view image system 10 is capable of suitably generating the traveling bird's-eye view image Pd of the surroundings of the traveling body 2 and the work bird's-eye view image Pw of the surroundings of the swivel base 3, while suppressing an increase in the number of cameras to be used. In addition, the bird's-eye view image system 10 is capable of corresponding to both of the traveling bird's-eye view image Pd and the work bird's-eye view image Pw, by only switching the first front camera 11A and the first rear camera 11B, and the second front camera 11E and the second rear camera 11F, and thus, is capable of suitably generating the traveling bird's-eye view image Pd and the work bird's-eye view image Pw, according to a simple configuration.

The bird's-eye view image system 10 superimposes the work vehicle marker M in which the swivel base marker portion M3 is superposed on the traveling body marker portion M2, on the traveling bird's-eye view image Pd, and superimposes the work vehicle marker M formed only of the swivel base marker portion M3, on the work bird's-eye view image Pw. That is, in the bird's-eye view image system 10, in the traveling mode Md, the control unit 12 superimposes the traveling body marker portion M2 representing the traveling body 2 and the swivel base marker portion M3 representing the swivel base 3, on the traveling bird's-eye view image Pd (the bird's-eye view image), as the work vehicle marker M represented by visualizing the crane vehicle 1 (the work vehicle), to be displayed on the display unit 13, and in the work mode Mw, the control unit 12 superimposes only the swivel base marker portion M3 on the work bird's-eye view image Pw (the bird's-eye view image), as the work vehicle marker M, to be displayed on the display unit 13. Here, in the crane vehicle 1, the traveling body 2 is moved in the traveling mode Md, and thus, it is desirable that the traveling bird's-eye view image Pd is an image of the surroundings of the traveling body 2 over the entire circumference. In addition, in the crane vehicle 1, the traveling body 2 is not moved in the work mode Mw, but the swivel base 3 to be swiveled thereon, is moved, and thus, it is desirable that the work bird's-eye view image Pw is an image of the surroundings of the swivel base 3 over the entire circumference. Then, the second front camera 11E, the second rear camera 11F, the right camera 11C, and the left camera 11D to be used in the work bird's-eye view image Pw, partially acquire the image of the traveling body 2, according to the swivel posture of the swivel base 3 with respect to the traveling body 2. Accordingly, the bird's-eye view image system 10 is capable of generating each bird's-eye view image P necessary for the operator, according to the mode of the crane vehicle 1, and is capable of setting the work vehicle marker M to be superimposed on the image, to be close to a state where the actual crane vehicle 1 is in a bird's-eye view, according to the mode.

That is, in the bird's-eye view image system 10, the traveling bird's-eye view image Pd represents the surroundings of the traveling body 2, and thus, it is possible to set the work vehicle marker M to be close to a state where the surroundings of the actual crane vehicle 1 in the traveling mode Md are in a bird's-eye view, by superimposing the work vehicle marker M in which the swivel base marker portion M3 is superposed on the traveling body marker portion M2, on the traveling bird's-eye view image Pd. In addition, in the bird's-eye view image system 10, the work bird's-eye view image Pw displays the surroundings of the swivel base 3 along with the traveling body 2, and thus, by superimposing the work vehicle marker M formed only of the swivel base marker portion M3, it is possible to swivel the traveling body 2 on the work bird's-eye view image Pw with respect to the swivel base marker portion M3, in a reverse direction, according to the swivel posture of the swivel base 3, and to set the work vehicle marker M to be close to a state where the surroundings of the actual crane vehicle 1 in the work mode Mw are in a bird's-eye view, centered on the swivel base 3. For this reason, the bird's-eye view image system 10 is capable of representing the bird's-eye view image P from which the operator is capable of easily and suitably grasp the situation of the surroundings without any uncomfortable feeling.

In the bird's-eye view image system 10, the work vehicle marker M superimposed on the traveling bird's-eye view image Pd, is directed towards the upper side in the display unit 13 while the front side of the traveling body marker portion M2 is coincident with the front side of the swivel base marker portion M3 (refer to FIG. 5). For this reason, the bird's-eye view image system 10 is capable of making the traveling bird's-eye view image Pd represented in the traveling mode Md (refer to FIG. 5) similar to the feeling seen from the operator in the cabin 5, and is capable of making the swivel base marker portion M3 similar to the crane vehicle 1 traveling in the traveling mode Md (refer to FIG. 2). Accordingly, in the traveling mode Md, the bird's-eye view image system 10 is capable of more easily visually recognizing the surroundings of the traveling body 2.

In the bird's-eye view image system 10, the work vehicle marker M superimposed on the work bird's-eye view image Pw, and the front side of the swivel base marker portion M3 are directed towards the upper side in the display unit 13 (refer to FIG. 6). For this reason, the bird's-eye view image system 10 is capable of making the work bird's-eye view image Pw represented in the work mode Mw (refer to FIG. 6) similar to the feeling seen from the operator in the cabin 5, and is capable of making the swivel base marker portion M3 similar to the crane vehicle 1 driven in the work mode Mw (refer to FIG. 3). Accordingly, in the work mode Mw, the bird's-eye view image system 10 is capable of more easily visually recognizing the surroundings of the swivel base 3.

Therefore, in the bird's-eye view image system 10 according to the embodiment to which the present invention is applied, it is possible to make the surroundings of the traveling body 2 provided with the swivel base 3 including the cabin 5, visible over the entire circumference.

As described above, the bird's-eye view image system of the present invention has been described on the basis of the embodiment, but a specific configuration is not limited to the embodiment, and design changes and additions are allowed within a range not departing from the gist of the present invention. In addition, the number of constituents, the positions and the shapes of the constituents, and the like are not limited to the example, and the number of constituents, the positions and the shapes of the constituents, and the like, suitable for carrying out the present invention, can be provided.

Furthermore, in the embodiment described above, the bird's-eye view image system 10 as one example of the bird's-eye view image system according to the present invention, has been described, but the bird's-eye view image system is not limited to the embodiment described above, insofar as being a bird's-eye view image system including the plurality of cameras for acquiring the surrounding image of the work vehicle provided with the swivelable swivel base on the traveling body, the display unit for displaying the bird's-eye view image based on the images acquired by each of the cameras, and the control unit for generating the bird's-eye view image to be displayed on the display unit, by converting the images acquired by each of the cameras into the image viewed from the upper virtual viewpoint, and by joining the images, in which each of the cameras includes the front camera provided in the traveling body on the forward side in the traveling body, the rear camera provided in the traveling body on the backward side in the traveling body, the right camera provided in the swivel base on the right side in the cabin provided in the swivel base, and the left camera provided in the swivel base on the left side in the cabin.

In addition, in the embodiment described above, the crane vehicle 1 has been described as the work vehicle using the bird's-eye view image system 10, but maybe a work vehicle having the other configuration insofar as being a work vehicle provided with the swivelable swivel base (3) on the traveling body (2), and it not limited to the embodiment described above.

Further, in the embodiment described above, as illustrated in FIG. 5 or FIG. 6, the work vehicle marker M is superimposed on each of the bird's-eye view images Pd and Pw, but there is a case where the work vehicle marker M partially hides each of the bird's-eye view images Pd and Pw, according to the installation position of each of the cameras 11. For example, in the traveling bird's-eye view image Pd illustrated in FIG. 5, a tip end spot of the boom 7, surrounded by a dotted line, corresponds to a hiding spot of each of the bird's-eye view images Pd and Pw. In the work bird's-eye view image Pw illustrated in FIG. 6, a part of the cabin 5 and approximately the half of the boom 7 on a tip end side, surrounded by a dotted line, correspond to the hiding spot. In the traveling bird's-eye view image Pd, such hiding spots are a spot positioned on the outside from the traveling body 2 in the swivel base 3, in a state where the crane vehicle 1 is seen from the upper side in the vertical direction. In the work bird's-eye view image Pw, the hiding spots are a spot in which the front is positioned on the front from the second front camera 11E in the swivel base 3, and are a spot in which the rear and both lateral sides are positioned on the outside from the swivel base 3. For this reason, in the bird's-eye view image system 10, in order to visually recognize each of the bird's-eye view images Pd and Pw over the entire circumference without any discontinuity, the work vehicle marker M in which the inside of the hiding spot is set to be transparent, to be semi-transparent, or not to be displayed while representing the outer shape of the hiding spot with a line, may be superimposed on each of the bird's-eye view images Pd and Pw. This can be executed by processing the display of each of the bird's-eye view images Pd and Pw and the hiding spot in the work vehicle marker M.

Figure 8:
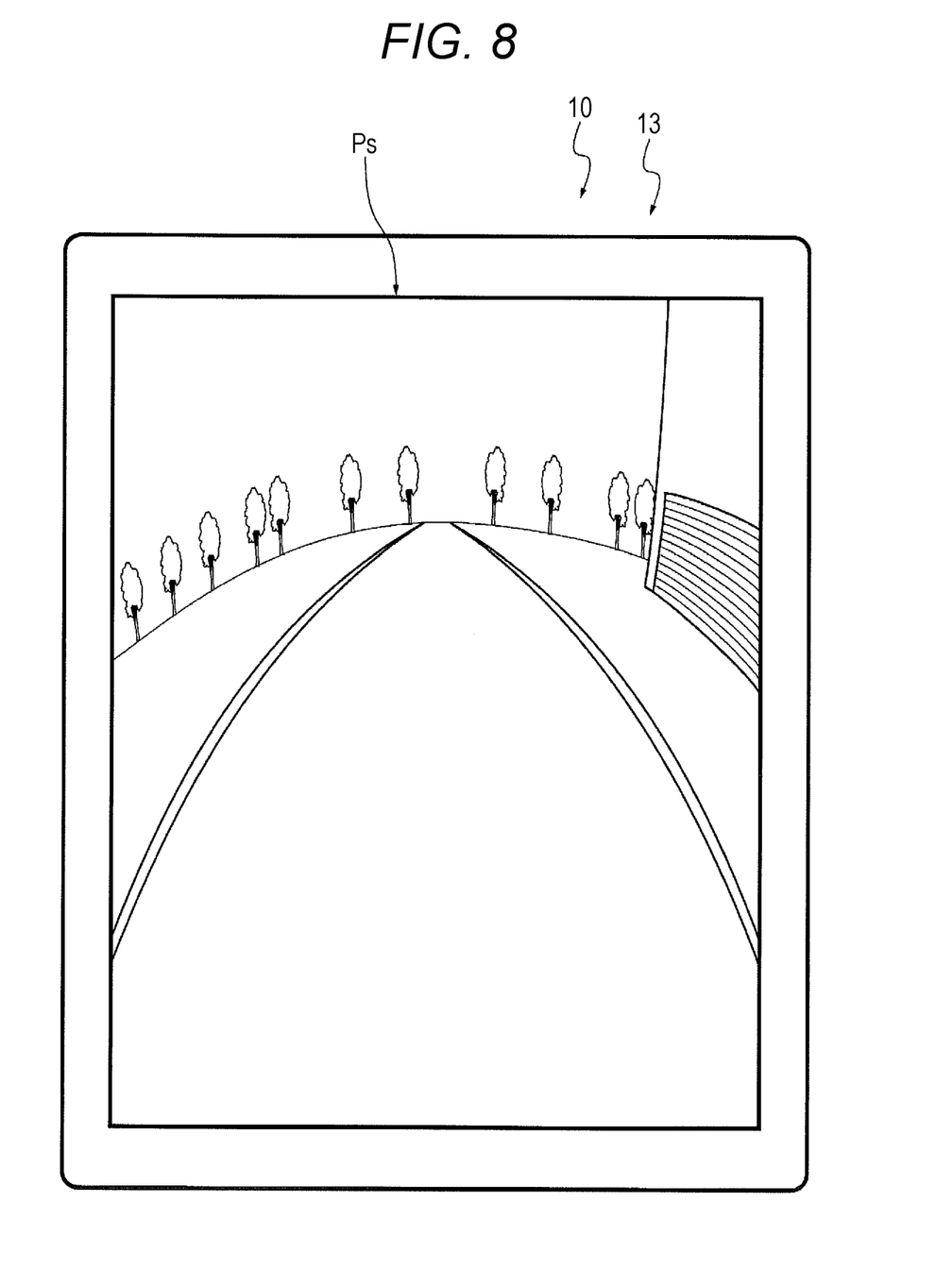
FIG. 8 is an explanatory diagram illustrating a state in which a front through image is displayed on the display unit.

In the embodiment described above, the work bird's-eye view image Pw is displayed on the display unit 13 in the work mode Mw, but other images may be displayed, and the display is not limited to the embodiment. Examples of the other display, as illustrated in FIG. 8, include a front through image Ps in which the image acquired by the second front camera 11E is displayed without being subjected to any processing. In the example illustrated in FIG. 8, there is the front through image Ps in a state where the swivel base 3 is swiveled with respect to the traveling body 2, as illustrated in FIG. 3, and thus, the traveling body 2 is not imaged on the front through image Ps, but the traveling body 2 is partially photographed according to the rotation posture of the swivel base 3. The front through image Ps is displayed as described above, and thus, the operator is capable of visually recognizing a spot that is a blind angle from the cabin 5, even on the front surface, and is capable of easily and suitably grasping the front situation. According to the display of the front through image Ps, it is possible to improve usability by enabling the work bird's-eye view image Pw to be switched. In addition, both of the work bird's-eye view image Pw and the front through image Ps may be simultaneously displayed on the display unit 13. Further, the display unit 13 may display (may be capable of switching or may simultaneously display) a through image acquired by the other camera (11A to 11D, and 11F) or an image based on each of the cameras (11A to 11F), as the other image, but is not limited to the example of FIG. 8. The same applies to the traveling mode Md.

REFERENCE SIGNS LIST

1 CRANE VEHICLE (AS AN EXAMPLE OF WORK VEHICLE)
2 TRAVELING BODY
3 SWIVEL BASE
5 CABIN
10 BIRD'S-EYE VIEW IMAGE SYSTEM
11 CAMERA
11A FIRST FRONT CAMERA
11B FIRST REAR CAMERA
11C RIGHT CAMERA
11D LEFT CAMERA
11E SECOND FRONT CAMERA
11F SECOND REAR CAMERA
12 CONTROL UNIT
13 DISPLAY UNIT
M WORK VEHICLE MARKER
M2 TRAVELING BODY MARKER PORTION
M3 SWIVEL BASE MARKER PORTION
Md TRAVELING MODE
Mw WORK MODE
P BIRD'S-EYE VIEW IMAGE
Pd TRAVELING BIRD'S-EYE VIEW IMAGE
Pw WORK BIRD'S-EYE VIEW IMAGE

The invention claimed is:

1. A bird's-eye view image system for displaying a bird's-eye view image of surroundings of a work vehicle provided with a swivelable swivel base on a traveling body, the system comprising:
an image processing unit for acquiring a first image acquired by a right camera and a left camera provided on the right and left of the swivel base, and a second image acquired by a front camera and a rear camera provided on the front and rear of the traveling body or the swivel base, and for generating the bird's-eye view image by synthesizing the first image and the second image, wherein
the front camera and the rear camera for acquiring the second image is switched according to a state of the work vehicle,
in a traveling mode which causes the work vehicle to travel in a state in which a forward direction of the traveling body is coincident with a front direction of a cabin provided in the swivel base, the second image is acquired from the front camera and the rear camera provided in the traveling body, and
in a work mode which causes the swivel base to be swivelable with respect to the traveling body, the second image is acquired from the front camera and the rear camera provided in the swivel base.

2. A bird's-eye view image display method for displaying a bird's-eye view image of surroundings of a work vehicle provided with a swivelable swivel base on a traveling body, the method comprising:
a step of acquiring a first image acquired by a right camera and a left camera provided on the right and left of the swivel base, and a second image acquired by a front camera and a rear camera provided on the front and rear of the traveling body or the swivel base, and generating the bird's-eye view image by synthesizing the first image and the second image; and
a step of switching the front camera and the rear camera for acquiring the second image according to a state of the work vehicle, wherein
in a traveling mode which causes the work vehicle to travel in a state in which a forward direction of the traveling body is coincident with a front direction of a cabin provided in the swivel base, the second image is acquired from the front camera and the rear camera provided in the traveling body, and
in a work mode which causes the swivel base to be swivelable with respect to the traveling body, the second image is acquired from the front camera and the rear camera provided in the swivel base.

3. A non-transitory computer-readable recording medium storing a program for causing a computer of a bird's-eye view image system for displaying a bird's-eye view image of surroundings of a work vehicle provided with a swivelable swivel base on a traveling body, to execute processing comprising:
processing of acquiring a first image acquired by a right camera and a left camera provided on the right and left of the swivel base, and a second image acquired by a front camera and a rear camera provided on the front and rear of the traveling body or the swivel base, and generating the bird's-eye view image by synthesizing the first image and the second image; and
processing of switching the front camera and the rear camera for acquiring the second image according to a state of the work vehicle, wherein
in a traveling mode which causes the work vehicle to travel in a state in which a forward direction of the traveling body is coincident with a front direction of a cabin provided in the swivel base, the second image is acquired from the front camera and the rear camera provided in the traveling body, and
in a work mode which causes the swivel base to be swivelable with respect to the traveling body, the second image is acquired from the front camera and the rear camera provided in the swivel base.

4. The bird's-eye view image system according to claim 1, wherein the image processing unit superimposes a traveling body marker portion representing the traveling body and a swivel base marker portion representing the swivel base on the bird's-eye view image, as a work vehicle marker represented by visualizing the work vehicle, in the traveling mode, and superimposes only the swivel base marker portion on the bird's-eye view image, as the work vehicle marker, in the work mode.

5. The bird's-eye view image system according to claim 4, wherein the image processing unit displays the traveling body marker portion such that a spot corresponding to a forward side of the traveling body in the traveling body marker portion is directed towards an upper side in a display unit, and displays the swivel base marker portion such that a spot corresponding to a front side of the cabin in the swivel base in the swivel base marker portion is directed towards the upper side in the display unit.

* * * * *